ROY B. PERSCHY
INVENTOR

Feb. 14, 1967 R. B. PERSCHY 3,304,552
DEVICE FOR CONVERTING CHANGING COORDINATE INPUTS
INTO RESULTANT MOTION
Filed Nov. 10, 1964 3 Sheets-Sheet 2

ROY B. PERSCHY
INVENTOR 3,304,552
DEVICE FOR CONVERTING CHANGING COORDINATE INPUTS INTO RESULTANT MOTION
Roy B. Perschy, Gardena, Calif., assignor to Ling-Temco-Vought, Inc., Dallas, Tex., a corporation of Delaware
Filed Nov. 10, 1964, Ser. No. 410,165
8 Claims. (Cl. 346—29)

This invention pertains to devices for mechanically coupling servo systems that are responsive to coordinate input data to styli that subscribe resultant motion according to input data. More particularly, this invention pertains to coordinate plotting devices that have front and rear carrier frames with linear guides for causing intermediate follower frames with styli to trace the resultant of the motions of the carrier frames. Each frame has a pair of linear guides on both of its surfaces, the guides being located on opposite sides of a central opening to provide accuracy in positioning of the follower and to provide an unobstructed projection window.

Accordingly, an embodiment of this invention comprises front and rear stationary mounting frames, front and rear carrier frames, a follower frame, the follower frame being mounted on spaced pairs of V-shaped-groove and ball-bearing linear guides between the carrier frames, the carrier frames and the intermediate follower frame being mounted on spaced pairs of V-shaped-groove and ball-bearing linear guides between the stationary mounting frames, the direction of the pairs of linear guides between the frames alternating between vertical and horizontal in progression from one mounting frame to the other, motive means for each of the carrier frames, the carrier frames being movable in mutually perpendicular directions, and the follower frame being movable with each of the carrier frames to trace a resultant of their motions. The construction according to this invention facilitates the mounting of a clear window that has a cutting stylus as shown in U.S. Patent 2,859,659 issued to D. M. Fenske et al. on November 11, 1958. As shown in that patent, a clear window with a stylus is operated to scribe a transparent mark on an opaque slide and thereby permit projection of a graph or figure while a permanent record is being made. In that prior plotter, a change in accerelation of the stylus in the vertical direction by the operation of servo motor for that direction is opposed by the mass of the horizontal frame and the horizontal servo system that is supported on the horizontal frame. In the coordinate plotter described herein, fast plotting time, while still maintaining a high degree of accuracy, is achieved. What is herein called carrier frames have been mounted by a pair of spaced linear guides on each side of a follower frame that carries the window and its stylus. One carrier frame and the frame follower are moved as a unit horizontally and the other carrier frame and the follower frame are moved as a unit vertically. Although each carrier frame moves the follower in a direction corresponding to that of a respective coordinate input, a change in motion of the follower frame by either carrier is unopposed by the coupling to the other follower frame. The low mass of the frames that are moved by application of a signal to either coordinate input of the plotter and the rugged construction permit fast operation.

An object of this invention is to provide for the purpose described herein a mechanical plotter that is capable of being operated faster than prior plotters.

Another object is to provide a plotter that plots very accurately at high operating speeds.

And still another object is to provide a plotter that is rugged and that will operate accurately while being exposed to vibration or high acceleration.

Other objects and advantages will be apparent from the specification and claims and from the accompanying drawing illustrative of the invention in which:

Figure 1:
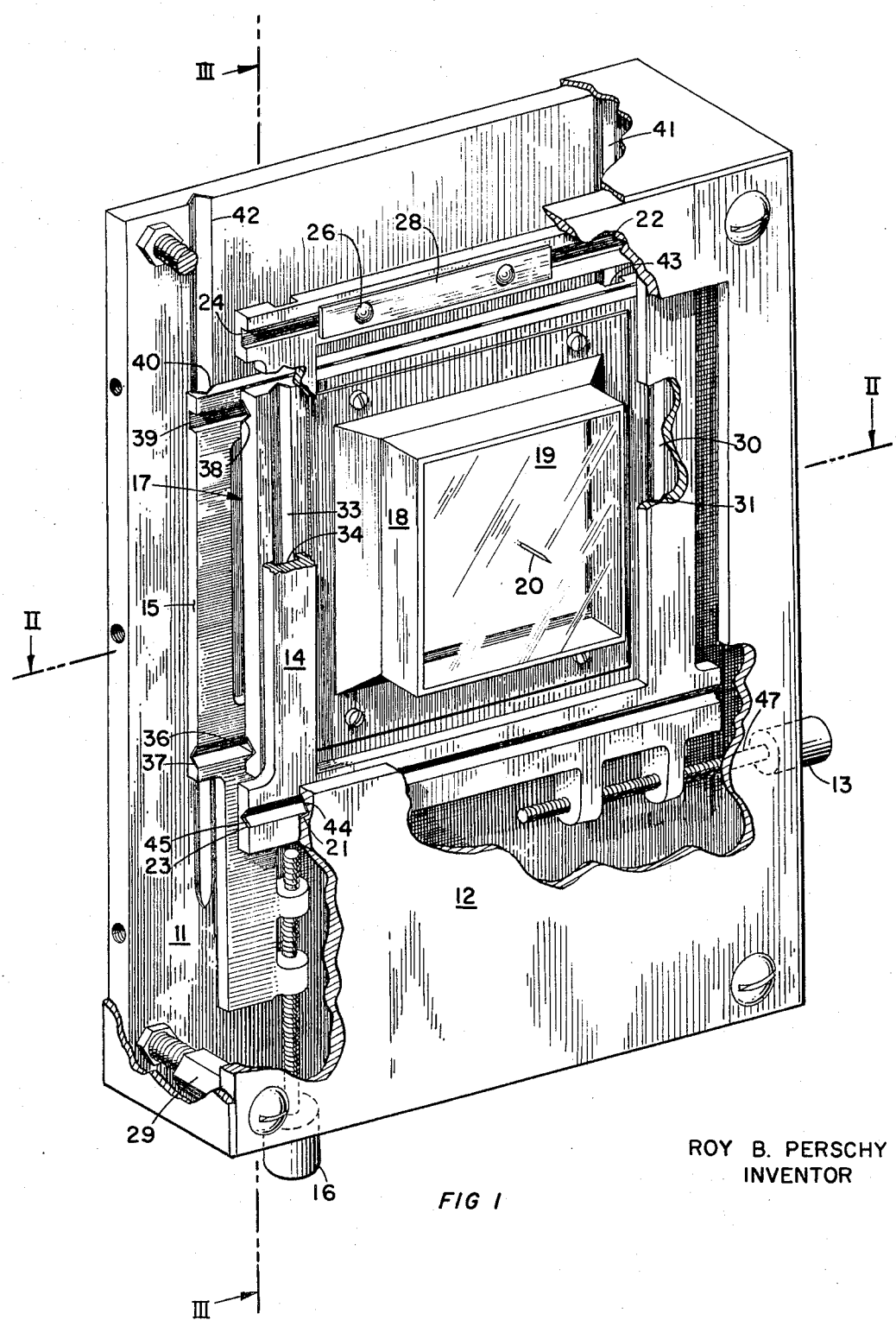
FIG. 1 is a front oblique view of the plotting device of this invention with portions of the frame structure cut away.

With reference to FIG. 1, the parallel rectangular mounting frames 11 and 12 are spaced apart by jack screws or adjustable spacing assemblies 29 that extend perpendicularly between the frames. One of the jack screws 29 may be located at each corner of the frames 11 and 12 and be adjusted precisely to provide accurate fit of the linear guides that are disposed between intermediate frames and between the intermediate frames and the mounting frames 11 and 12. Motion in the direction of an X-coordinate axis is transferred to a front carrier frame 14 by a servo motor 13, and motion in the direction of a Y-coordinate axis is transferred to a rear carrier frame 15 by a servo motor 16. The movement that is transferred to each of the carrier frames 14 and 15 is applied through linear guides to a follower frame 17 that is mounted between the carrier frames 14 and 15. A rectangular frame 18 is secured to the follower frame 17 and extends forward past the carrier frame 14 and the front stationary mounting frame 12. A transparent material 19 is mounted across the front edge of the mounting frame 12 to carry a small marking stylus 20.

Each of the superimposed frames 12, 14, 17, 15, and 11 is mounted parallel to each adjacent frame by groove and ball-bearing mounting means. Of any two facing surfaces of any adjacent frames, one surface, such as the back surface of the front mounting frame 12, has two parallel V-shaped grooves, for example, grooves 21 and 22, the grooves being along opposite sides of a central opening. The other one of the facing surfaces, for example, the front surface of the front carrier frame 14, has a V-shaped groove, for example, groove 23, and a parallel rectangular or flat groove, for example, groove 24, the grooves also being spaced along opposite sides of an opening of the respective frame.

Figure 3:
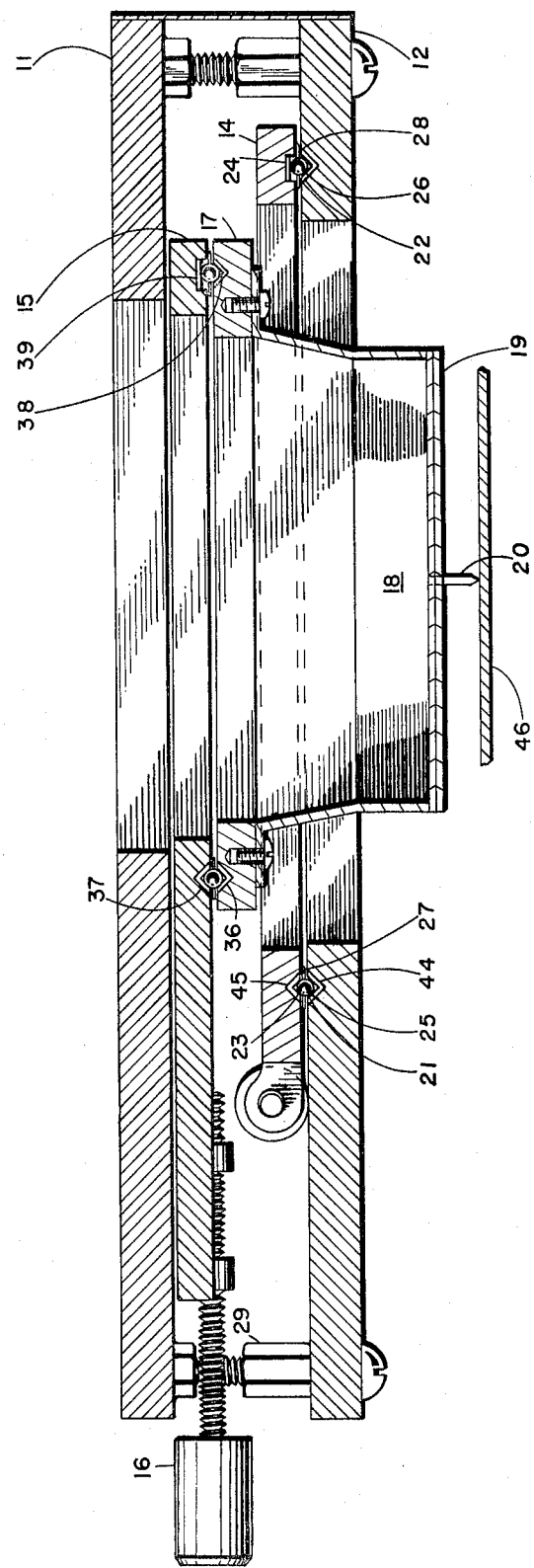
FIG. 3 is a longitudinal cross-sectional view taken on line 3—3 of FIG. 1.

The centers of the grooves on any one of the adjacent facing surfaces are spaced apart the same distance as the centers of the grooves on the other one of the surfaces so that corresponding grooves match as the faces are placed together to provide a channel between them for receiving ball-bearings. With reference to FIG. 3, the linear guide means that couples the front carrier frame 14 to the front mounting frame 12 comprises the matching V-shaped grooves 21 and 23, a plurality of spaced ball bearings 25, and at the opposite sides of the openings of the frames 12 and 14, matching V-shaped groove 22 and a rectangular, or flat, groove or channel 24, and a plurality of spaced ball bearings 26.

The ball bearings 25 that are contained within grooves 21 and 23 are retained by a retainer 27 and likewise the bearings 26 that are contained within the grooves 22 and 24 are retained by a retainer 28. Each of the retainers 27 and 28 is a flat piece of metal with spaced holes centered between its edges for receiving the bearings freely. For example, retainer 27 is centered longitudinally relative to the facing V-grooves 23 and 24 and normally floats freely between the frames 12 and 14. Stops (not shown) are provided for the movable frames 14, 15, and 17 and also for each of the bearing retainers as represented by retainers 27 and 28 to retain the movable frames and the bearings in proper relationship during handling or during periods of application of wrong control voltage to either the servo motor 16 or the servo motor 13.

The facing V-shaped grooves 21 and 23 and the ball bearings 25 contained therein provide precise linear guidance for the front carrier frame 14 as it is moved horizontally by operation of the servo motor 13. This linear guide and the leveling or spacing guide that comprises the V-shaped groove 22, the rectangular channel 24, and the ball bearings 26 determine that the front carrier frame 24 is parallel to its adjacent mounting frame 12. The depth of the rectangular channel 24 is accurately machined to obtain parallelism but the width is not critical for the sides of this channel are not used for guidance. The width of the channel 24 must merely be sufficient to permit clearance between its sides and the ball bearings 26 that are guided in the channel 24 by the V-shaped groove 22 that in turn is positioned laterally by the parallel linear guide that has V-shaped grooves 21 and 23.

An arrangement of linear guides similar to that disposed between the front mounting frame 12 and the front carrier frame 14 is disposed between other adjacent surfaces of the plotter. The direction of the linear guides alternate between horizontal and vertical successively front front to rear. The linear guide between the front mounting frame 12 and the front carrier frame 14 that has been described in detail, is horizontal. A vertical guide arrangement between the front carrier frame 14 and the follower or scribing frame 17, FIG. 2, comprises matching V-shaped grooves 30 and 31, a plurality of ball bearings 32 contained therein, and, along opposite portions of the frames that are across their central openings, parallel V-shaped groove 33, a matching rectangular channel 34, and a plurality of ball bearings 35. With reference to FIG. 3, a horizontal linear guide between the follower frame 17 and the rear carrier frame 15 includes the facing V-grooves 36 and 37 and, on the opposite sides of the frames, V-groove 38 and a matching rectangular channel 39. Ball bearings and retainers are provided for each set of matching grooves. Finally in FIG. 2, the guides disposed between the rear carrier frame 15 and the rear mounting frame 11 for providing exact linear vertical motion of the frame 15 and for maintaining parallelism, comprises vertical matching V-shaped grooves 40 and 41, and along opposite sides of the frames, vertical V-groove 42 and a matching rectangular channel 43.

The movable carrier frames 14 and 15 and the follower frame 17 are fabricated from a rigid material with low mass to provide accurate plotting at high rates of acceleration of these frames. Aluminum is a suitable material for the movable frames 14, 15, and 17 and also for the stationary mounting frames 11 and 12. In order to retain accuracy and to provide for long wear of the grooves, each of the grooves in the aluminum frames is provided with a steel insert or liner. For example, as shown in FIG. 3, the V-shaped groove 21 of the front mounting frame 12 and the facing V-shaped groove 23 of the front carrier frame 14 have steel inserts 44 and 45 respectively. The V-shaped grooves and the ball bearings are accurately machined to provide exact linear movement.

The outside stationary frames 11 and 12 inherently provide sufficient spring action for properly loading all the ball bearings that correspond to bearings 32 and 35 in a direction perpendicular to the faces of all the frames. The four jack screws 29 that are located near the corners of the mounting frames are adjusted evenly until a prescribed testing force, for example, 45 grams, is required to be applied in a horizontal direction to the front carrier frame 14 to move it horizontally at a constant velocity and the same force is required to be applied vertically to the rear carrier frame to move it vertically at a constant velocity.

Figure 2:
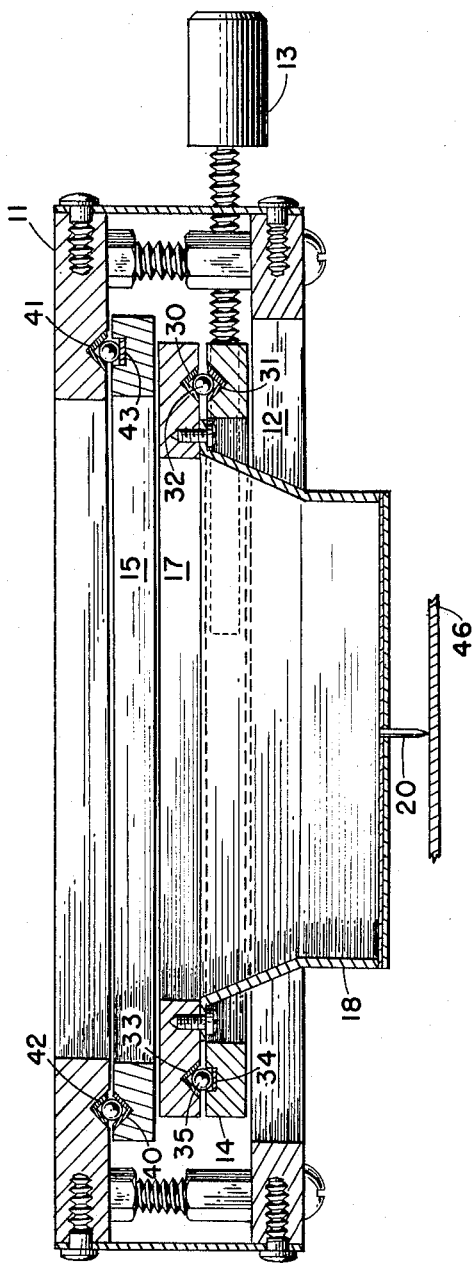
FIG. 2 is a lateral cross-sectional view of the plotter taken on line 2—2 of FIG. 1.

In operation, the stylus 20 of FIG. 2 is moved in a path that is the resultant of the horizontal movement that is transferred to the front carrier frame 14 by the servo motor 13 and the vertical movement that is transferred to the rear carrier frame 15 by servo motor 16. The stylus 20 presses against a slide or plate 46 (FIG. 2) that has an opaque coating that faces the plotter.

In more detail, the servo motor 13 of FIG. 1 is operated in response to application of the input signals that are usually generated at a remote station where plotting data is available. The motor is responsive to signal of one sense to move the front carrier frame 14 horizontally in a direction corresponding to a negative direction along a coordinate X-axis and is responsive to signal of another sense to move the frame 14 in an opposite or positive direction. The servo motor 13 may be drivingly coupled to the carrier frame 14 by a lead screw 47, as shown, or by a system of spaced pulleys and drive bands or belts.

The movement of the front carrier frame 14 is precisely linear in a horizontal direction relative to the front mounting frame 12 as determined by the V-grooves 21 and 23. The follower frame 17 is precisely coupled for horizontal movement to the front carrier frame by the linear guide that includes the vertical grooves 30 and 31. The follower frame 17 is coupled to the rear carrier frame 15 through the grooves 36 and 37 that permit free horizontal movement of the follower frame 17 relative to the rear carrier frame 15, but restrains the follower frame 15 precisely to the vertical movement of the rear carrier frame 15. When the servo motor 16 is stopped so that the rear carrier frame 15 is not in motion relative to the mounting frames 11 and 12, operation of the servo motor 13 causes the front carrier frame 14 and the follower frame 17 to move as a unit in a horizontal direction along the grooves 21 and 23 and the grooves 36 and 37. A horizontal transparent line is drawn by the stylus 20 on the face of the slide 46 when the stylus is pressed against the slide.

Likewise, when the servomotor 16 operates in response to application of signal that corresponds to desired movement along a coordinate Y-axis and the servo motor 13 is stopped, the follower frame 17 is moved vertically to cause the stylus 20, when it engages the slide 46, to inscribe a vertical line. While the servo motor 13 is stopped and the servo motor 16 is operated, the rear carrier frame 15 and the follower frame 17 are moved vertically as a unit between the vertical guides that includes the vertical matching grooves 40 and 41 and the vertical guide that includes grooves 30 and 31. When both servo motors 13 and 16 are in operation, the follower frame 17 is moved in a path that is the resultant of the motion of the adjacent carrier frames 14 and 15.

In the accompanying illustrations, the transparent plate 19 is simply shown attached immovably to the front edge of the protruding rectangular frame 18 that is secured to the follower frame 17. However, in practice, the transparent plate 19 is either pivotally or slidingly mounted to the frame so that the stylus 20 is moved slightly forward in response to a marking control signal to engage the slide 46 of FIG. 2 and is moved slightly rearwardly to withdraw the stylus 20 from the slide 46 in response to a change in control signal as taught in the U.S. Patent 2,859,659 cited above. As shown in that patent, the stylus is urged in contact with the slide 46 by springs at sliding mountings and is forced out of engagement by operation of solenoids that press against the transparent plate 19.

The use of superimposed carrier and follower frames as described above provide faster action than hitherto-fore obtained in equipments of the type that make permanent records while displaying graphical data while it is being accurately plotted. A preferred embodiment that utilizes linear guides disposed about opposite edges of centrally located windows of the different frames, as shown in the accompanying drawing, provides a relatively simple, rugged, accurate structure to accommodate plotting information on small slides. When the slides are large, a window and a stylus may be attached to a follower plate adjacent those carrier frames or plates that have linear guides and that are operated by respective servo systems. The movable frames 14, 15, and 17 have minimum mass that is consistent with rigid construction. Each servo system that operates to introduce coordinate data to the plotter, operates through a respective carrier frame to move a follower frame; the movement of the follower frame by either of the carrier frames 14 and 15 is almost free of opposition from the other carrier frame. The low mass of the frames that are moved by each servo permits much faster rate of operation than that rate attained in prior equipments. The linear guides require a minimum amount of material and provide great accuracy. The steel linings for the grooves and the supporting steel bearings provide the ruggedness that is required because of the normal high rates of acceleration of the movable frames in normal operation. Because of this ruggedness that is normally required, the plotter withstands rough handling and even plots accurately while exposed to high rates of acceleration.

While only one embodiment of the invention, together with modifications thereof, has been described in detail herein and shown in the accompanying drawing, it will be evident that various further modifications are possible in the arrangement and construction of its components without departing from the scope of the invention.

I claim:

1. In a coordinate plotting device, a first stationary mounting member, a first carrier frame, a follower frame, a second carrier frame, and a second stationary mounting member arranged successively in adjacent superimposed planes,
   said first carrier frame being mounted for horizontal movement relative to said mounting members, first controllable motive means operable in response to application thereto of coordinate data input to move said first carrier frame horizontally over a limited distance relative to said mounting frame,
   said second carrier frame being mounted for vertical movement relative to said mounting members, second controllable motive means operable in response to application thereto of coordinate data input to move said second carrier frame vertically over a limited distance relative to said mounting frames,
   said mounting frames being mounted precisely for linear motion in their respective directions that are mutually perpendicular without noticeable movement in any other direction, said follower frame being mounted for precise free vertical movement only relative to said first carrier frame and for precise free horizontal movement only relative to said second carrier frame, whereby said follower frame is moved accurately in a path that is the resultant of the motion of said carrier frames,
   said follower frame having a transparent window with a stylus attached perpendicularly thereto to provide passage of a projection beam through said window, and said mounting members and said carrier frames being constructed about said window so as to permit unobstructed passage of light through the window for any position of said carrier frames as required for projection.

2. In a coordinate plotting device, a plurality of superimposed parallel members comprising a first stationary mounting member, a first carrier member, a follower member, a second carrier member, and a second stationary mounting member in successive order,
   a plurality of linear guides, each of said members being slidingly coupled to each adjacent one of said members by at least two spaced parallel ones of said linear guides, the direction of the ones of said linear guides for coupling between different adjacent ones of said members alternating between horizontal and vertical successively from said first stationary mounting member to said second stationary mounting member,
   means for moving each of said carrier members a limited distance relative to said stationary members in the direction of said linear guides that couple said respective carrier frame to said adjacent mounting member, the motions of said carrier members being transferred precisely to said follower member to trace the resultant motion thereof, and a stylus for marking attached to said follower member.

3. A device for accurately translating coordinate information into resultant motion comprising:
   first and second mounting members that are rigidly spaced apart,
   first and second carrier members,
   a follower member,
   each of said mounting members having on its surface that faces said other mounting member plane surface portions that are spaced apart along parallel lines to permit an adjacently mounted one of said members to slide thereover in the direction of said lines, said carrier member and said follower member each having on each of two opposite faces thereof exposed plane surface portions that are spaced apart along parallel lines, the directions of the parallel lines on one face thereof being perpendicular to the parallel lines on the other face thereof,
   one of said mounting members having a horizontal groove along each of said parallel lines on each of said plane surface portions thereof, the other of said mounting members having a vertical groove along each of said parallel lines on each of said plane surface portions thereof,
   said first and second carrier members each having on one side thereof a groove along each of said parallel lines on each of said plane surfaces thereof,
   said grooves of said first carrier member and said grooves of said first mounting member being spaced apart the same distance to match when their respective grooved surfaces are adjacently aligned,
   said grooves of said second carrier member and said grooves of said second mounting member also being matched, said first carrier member and said first mounting member being mounted with respective ones of said plane surfaces portions parallel and their respective matching pairs of grooves being adjacently aligned, likewise said second carrier member and said second mounting member being mounted with their respective matching pairs of grooves being adjacently aligned,
   a plurality of bearings retained spaced apart within the space between each pair of said adjacent matched grooves, said bearings readily permitting motion of said carrier members linearly in the direction of respective ones of said grooves and being precisely fitted in at least one of said matching pair of grooves between each of said carrier members and said adjacent mounting members to prevent noticeable motion of said carrier members transverse the respective grooves,
   each of said carrier members having grooves in its plane surface portions on its other face along parallel lines that are perpendicular to the direction of said grooves that are in the plane surface portion on said one face thereof,
   said follower member having in said plane surface portions on one face thereof grooves to match said parallel grooves in said other face of said first carrier member and having in said plane surface portions on its other face grooves to match said grooves in said other face of said second carrier member, said grooves on one face of said follower member being perpendicular to the grooves on its other face,
   a plurality of bearings for mounting said follower member with its plane surface portions parallel between said carrier members, said matching grooves being adjacently aligned, a plurality of said last-mentioned bearings being retained spaced apart in each space between each pair of said adjacent matching grooves of said follower member and said carrier members, said bearings readily permitting motion of said follower member relative to each one of said adjacent carrier members in the direction of their respective adjacent grooves but preventing noticeable motion of said follower member transverse said respective adjacent grooves, and means for moving each of said carrier members in a direction of its grooves that match adjacent grooves of an adjacent one of said mounting frames to transfer a resultant motion to said follower member.

4. A plotting device as claimed in claim 3 in which said follower member has a transparent window and a stylus mounted perpendicularly on said window.

5. In a coordinate plotting device, a plurality of superimposed parallel members comprising a first stationary mounting structure, a first carrier frame, a follower frame, a second carrier frame, and a second stationary mounting structure in successive order, a plurality of linear guides, said follower frame having a transparent window for projecting an image placed in said window, each of said other members having a frame structure with a portion of each of said frames extending along at least each of two opposite sides of said window to accommodate at least one of said linear guides, each of said members being slidingly coupled to each adjacent one of said members by at least one of said linear guides along each one of said respective opposite portions along said window, said spaced linear guides that slidingly couple any two adjacent ones of said members being parallel, the direction of said linear guides for coupling between the different adjacent ones of said members alternating between horizontal and vertical successively from said first stationary mounting structure to said second stationary mounting structure, means for moving each of said carrier frames a limited distance relative to said stationary structures in the direction of said linear guides that couple said respective carrier frame to said adjacent mounting structure, the motions of said carrier frames being transferred precisely to said follower frame to trace the resultant motion thereof, and said window being unobstructed in a direction perpendicular thereto regardless of the relative positions of said carrier frames with respect to said stationary structures.

6. A device for accurately translating coordinate information into resultant motion comprising:

first and second parallel rectangular mounting frames that are rigidly spaced apart, each of said mounting frames having an unobstructed central opening for permitting transmission of a beam of light perpendicularly through both of said openings, first and second rectangular carrier frames, a rectangular follower frame, one of said mounting frames having a horizontal groove along each of its horizontal side portions, the other of said mounting frames having a vertical groove along each of its vertical side portions, each of said grooves for each of said mounting frames being in its surface that faces the other of said mounting frames, said first and second carrier frames each having in one face a groove in each of two opposite sides, said last-mentioned grooves for each of said carrier frames being parallel, said grooves of said first carrier frame and said grooves of said first mounting frame being spaced apart the same distance to match when their respective grooved surfaces are adjacent, said grooves of said second carrier frame and said grooves of said second mounting frame also being matched, said first carrier frame and said first mounting frame being mounted parallel with their respective matching pairs of grooves being adjacently aligned, likewise said second carrier frame and said second mounting frame being mounted with their matching pairs of grooves adjacently aligned, a plurality of bearings retained spaced apart within the space between each pair of said adjacent matched grooves, said bearings readily permitting motion of said carrier frames relative to said mounting frames in the direction of the respective ones of said grooves and being precisely fitted in at least one of said matching pair of grooves between each of said carrier frames and said adjacent mounting frame to prevent noticeable motion transverse said respective grooves, each of said carrier frames having grooves in its other face in its other opposite sides oriented in a direction perpendicular to the direction of grooves in said one face thereof, said follower frame in one of its faces having grooves along opposite side portions to match said grooves in said other face of one of said carrier frames and in the other of its faces having grooves along other of its opposite side portions to match said grooves in said other face of the other one of said carrier frames, a plurality of bearings for mounting said follower frame parallel between said carrier frames with their matching grooves being adjacent, a plurality of said last-mentioned bearings being retained spaced apart in each space between each pair of said adjacent matching grooves, said bearings readily permitting motion of said follower frame relative to each one of said adjacent carrier frames in the direction of said respective adjacent grooves but preventing noticeable motion transverse said respective adjacent grooves, and means for moving each of said carrier frames in a direction of its grooves that match adjacent grooves of a respective one of said mounting frames to transfer a resultant motion to said follower frame.

7. A plotting device as claimed in claim 6 in which said follower frame has a transparent window and a stylus mounted perpendicularly on said transparent window.

8. A plotting device comprising:

front and rear rectangular mounting frames spaced apart in a parallel relation, front and rear carrier frames, a follower frame, said follower frame having a transparent plate mounted therein, a stylus attached to said transparent plate, said follower frame being parallel and slidingly mounted between said carrier frames, said carrier frames complete with said mounted follower frame being slidingly mounted parallel between said mounting frames, said front carrier frame and said front mounting frame each having a plurality of widely spaced horizontal precision grooves, each of said grooves of said front carrier frame facing a matching one of said grooves of said front mounting frame, each of said grooves of at least one of said pairs of matching grooves having a V-shape, a plurality of ball bearings, means for retaining a plurality of said ball bearings spaced apart within the space between each of said matching grooves of said front carrier frame and said front mounting frame, a groove and bearing mounting disposed between said front carrier frame and said follower frame, between said follower frame and said rear carrier frame, and between said rear carrier frame and said rear mounting frame, each of said groove and bearing mountings comprising a plurality of matched grooves having a plurality of said ball bearings in an arrangement similar to that for the mounting between said front carrier frame and said front mounting frame, each groove of at least one pair of said matched grooves for each of said groove and bearing mountings having a V-shape, said matched grooves between the surfaces of said front carrier frame and said follower frame being vertical, the direction of said grooves between facing surfaces of said frames alternating between vertical and horizontal for the different facing surfaces of said frames successively from said front mounting frame to said rear mounting frame so that said follower frame is constrained to move horizontally in unison with said front carrier frame and to move vertically in unison with said rear carrier frame, said follower frame being free to move vertically relative to said front carrier frame and to move horizontally relative to said rear carrier frame, means for moving said front carrier frame horizontally relative to said mounting frames, means for moving said rear frame vertically relative to said mounting frames, and said follower frame being moved precisely by said carrier frames to trace the resultant motion thereof.

References Cited by the Examiner

UNITED STATES PATENTS

| | | | |
|---|---|---|---|
| 2,859,659 | 11/1958 | Fenske et al. | 88—24 |
| 2,940,357 | 6/1960 | Oswold | 88—40 X |
| 3,006,245 | 10/1961 | Bycer et al. | 88—40 |
| 3,151,927 | 10/1964 | Angst et al. | 346—29 |

RICHARD B. WILKINSON, *Primary Examiner.*

J. W. HARTARY, *Assistant Examiner.*